(12) United States Patent
Kato et al.

(10) Patent No.: US 10,873,219 B2
(45) Date of Patent: Dec. 22, 2020

(54) CONTACTLESS POWER SUPPLY DEVICE (71) Applicant: FUJI CORPORATION, Chiryu (JP)

(72) Inventors: Shinichi Kato, Anjo (JP); Takeshi Nomura, Chiryu (JP); Masayuki Oki, Chiryu (JP)

(73) Assignee: FUJI CORPORATION, Chiryu (JP)

( * ) Notice: Subject to any disclaimer, the term of this patent is extended or adjusted under 35 U.S.C. 154(b) by 19 days.

(21) Appl. No.: 16/337,496

(22) PCT Filed: Sep. 30, 2016

(86) PCT No.: PCT/JP2016/079117
§ 371 (c)(1),
(2) Date: Mar. 28, 2019

(87) PCT Pub. No.: WO2018/061200
PCT Pub. Date: Apr. 5, 2018

(65) Prior Publication Data
US 2019/0288559 A1   Sep. 19, 2019

(51) Int. Cl.
*H02J 50/12* (2016.01)
*H02J 5/00* (2016.01)
(Continued)

(52) U.S. Cl.
CPC ............. *H02J 50/12* (2016.02); *B60L 5/005* (2013.01); *H02J 7/025* (2013.01); *H02M 3/156* (2013.01); *H02M 7/12* (2013.01); *H02J 5/005* (2013.01)

(58) Field of Classification Search
CPC . B60L 5/005; H02J 5/005; H02J 7/025; H02J 50/10; H02J 50/12; H02M 3/156; H02M 7/12
(Continued)

(56) References Cited

U.S. PATENT DOCUMENTS

2009/0015224 A1* 1/2009 Hirao ................. H03K 17/6871
323/282
2010/0295506 A1* 11/2010 Ichikawa ................ B60L 53/60
320/108
(Continued)

FOREIGN PATENT DOCUMENTS

EP    2 431 214 A1    3/2012
EP    3 038 231 A1    6/2016
(Continued)

OTHER PUBLICATIONS

International Search Report dated Dec. 6. 2016 in PCT/JP2016/079117 filed on Sep. 30, 2016.
(Continued)

*Primary Examiner* — Levi Gannon
(74) *Attorney, Agent, or Firm* — Oblon, McClelland, Maier & Neustadt, L.L.P.

(57) ABSTRACT

Contactless power supply device of the present invention includes: contactless power supply section that supplies AC power in a contactless manner; contactless power receiving section that receives the AC power in a contactless manner; first DC transformer circuit that transforms, to DC load voltage, DC reception-power voltage obtained from the contactless power receiving section and supplies the DC load voltage to first electric load, and that has a reverse transfer function of transferring regenerative power generated by the first electric load in a reverse direction; and second DC transformer circuit that transforms the DC reception-power voltage to DC load voltage and supplies the DC load voltage to second electric load. Accordingly, the generated regenerative power is allocated and made available to the other electric load, and a power storage section is not necessary, which suppresses an increase in the weight and size of the power-receiving-side device.

12 Claims, 3 Drawing Sheets

(51) Int. Cl.
*H02J 7/02* (2016.01)
*H02M 3/156* (2006.01)
*H02M 7/12* (2006.01)
*B60L 5/00* (2006.01)

(58) Field of Classification Search
USPC .......................................................... 307/104
See application file for complete search history.

(56) References Cited

U.S. PATENT DOCUMENTS

| 2012/0043807 | A1  | 2/2012 | Ichikawa |            |
|---|---|---|---|---|
| 2013/0088177 | A1* | 4/2013 | Niizuma  | H02J 2207/20 |
|              |     |        |          | 318/139 |
| 2013/0128633 | A1* | 5/2013 | Ichihara | H02M 3/156 |
|              |     |        |          | 363/37 |
| 2013/0176653 | A1* | 7/2013 | Kim      | H02H 9/04 |
|              |     |        |          | 361/91.6 |
| 2015/0069832 | A1  | 3/2015 | Yamane et al. | |
| 2016/0204642 | A1  | 7/2016 | Oh et al. | |

FOREIGN PATENT DOCUMENTS

| JP | 2003-63613 A  | 3/2003 |
|---|---|---|
| JP | 2004-135405 A | 4/2004 |
| JP | 2011-125184 A | 6/2011 |
| JP | 2014-79077 A  | 5/2014 |
| JP | 2015-73423 A  | 4/2015 |

OTHER PUBLICATIONS

Hajimemashite, Econo Nikki, Meister, [online], Dec. 7, 2012, Internet <URL: http://www.mesiter.ne.jp/reports/econo/2012/12/post-30.html>, with unedited computer-generated English translation. 30 pages.

Extended European Search Report dated Aug. 12, 2019 in Patent Application No. 16917750.8, 7 pages.

* cited by examiner

CONTACTLESS POWER SUPPLY DEVICE

TECHNICAL FIELD

The present application relates to a contactless power supply device that performs contactless power supply, and more specifically relates to a contactless power supply device in which at least some of the multiple electric loads to which power is supplied have a power regeneration function.

Contactless power supply devices that perform contactless power supply from a contactless power supply section to a contactless power receiving section are being developed. There are three major contactless power supply methods, namely, an electromagnetic induction method, a capacitive coupling method, and an electromagnetic field resonance method. A large number of contactless power supply devices employ a configuration in which an alternating current is used in a power source in the contactless power supply section and the alternating current is rectified in the contactless power receiving section. Further, in a case where an electric load to which power is supplied in a contactless manner has a power regeneration function, it is proposed that regenerative power be effectively used to reduce the load of contactless power supply. Example techniques for using regenerative power in contactless power supply devices are disclosed by patent literature 1 and 2.

An automated warehouse according to patent literature 1 includes a power supply line, a power receiving device that obtains a current from a magnetic field generated in the power supply line, a conversion circuit that converts the current obtained by the power receiving device to a constant voltage, a driving source that is driven by the constant voltage, and a charge capacitor that stores regenerative power generated by the driving source. According to this literature, the regenerative power generated by the driving source can be stored in the charge capacitor and used when a large amount of power is needed, such that the size of the power receiving device can be reduced.

A motive power supply device for a steep-slope conveyance wheeled table according to patent literature 2 includes a power source device constituted by a power supply conductor and a high-frequency inverter on a track side, and a power receiving device constituted by a power receiving coil, a rectifier circuit, a control device, and a motor inverter on the conveyance wheeled table side to supply power to a motor. Further, the motive power supply device is characterized in that a charging-discharging device constituted by a converter that performs DC-DC conversion of regenerative power released from the motor when the conveyance wheeled table travels downward and a battery that stores the converted regenerative power is provided, and the regenerative power is output as appropriate to drive the motor. According to this literature, the regenerative power can be efficiently used to drive the motor, the size of the motive power supply device can be reduced, and device costs can be decreased.

CITATION LIST

Patent Literature

Patent Literature 1: JP-A-2003-63613
Patent Literature 2: JP-A-2004-135405

BRIEF SUMMARY

Technical Problem

The charge capacitor that stores regenerative power is used in patent literature 1, and the battery that stores regenerative power is used in patent literature 2. However, the use of a power storage section, such as the charge capacitor or the battery, results in an increase in the weight and size of the power-receiving-side device. The power-receiving-side device is typically provided in a moving body, such as the conveyance wheeled table, and an increase in the weight and size causes a significant problem.

The present disclosure has been made in view of the above-described problem in the background art, and an issue that is addressed is to provide a contactless power supply device that allows the use of regenerative power generated by an electric load while suppressing an increase in the weight and size of the power-receiving-side device.

Solution to Problem

A contactless power supply device disclosed herein includes: a contactless power supply section configured to supply AC power in a contactless manner; a contactless power receiving section disposed so as to face the contactless power supply section and configured to receive the AC power in a contactless manner; a first DC transformer circuit configured to transform, to a DC load voltage, a DC reception-power voltage obtained by converting an AC voltage of the AC power received by the contactless power receiving section and supply the DC load voltage to a first electric load, and to have a reverse transfer function of transferring regenerative power generated by the first electric load in a reverse direction; and a second DC transformer circuit configured to transform the DC reception-power voltage to a DC load voltage and supply the DC load voltage to a second electric load.

Advantageous Effects

In the contactless power supply device disclosed herein, the first DC transformer circuit transfers the regenerative power generated by the first electric load in the reverse direction. Therefore, the regenerative power is allocated and made available to the other electric loads including the second electric load. Further, a power storage section is not necessary, which curtails an increase in the weight and size of the power-receiving-side device.

DESCRIPTION OF EMBODIMENTS

Configuration of Contactless Power Supply Device 1 of an Embodiment

Figure 1:
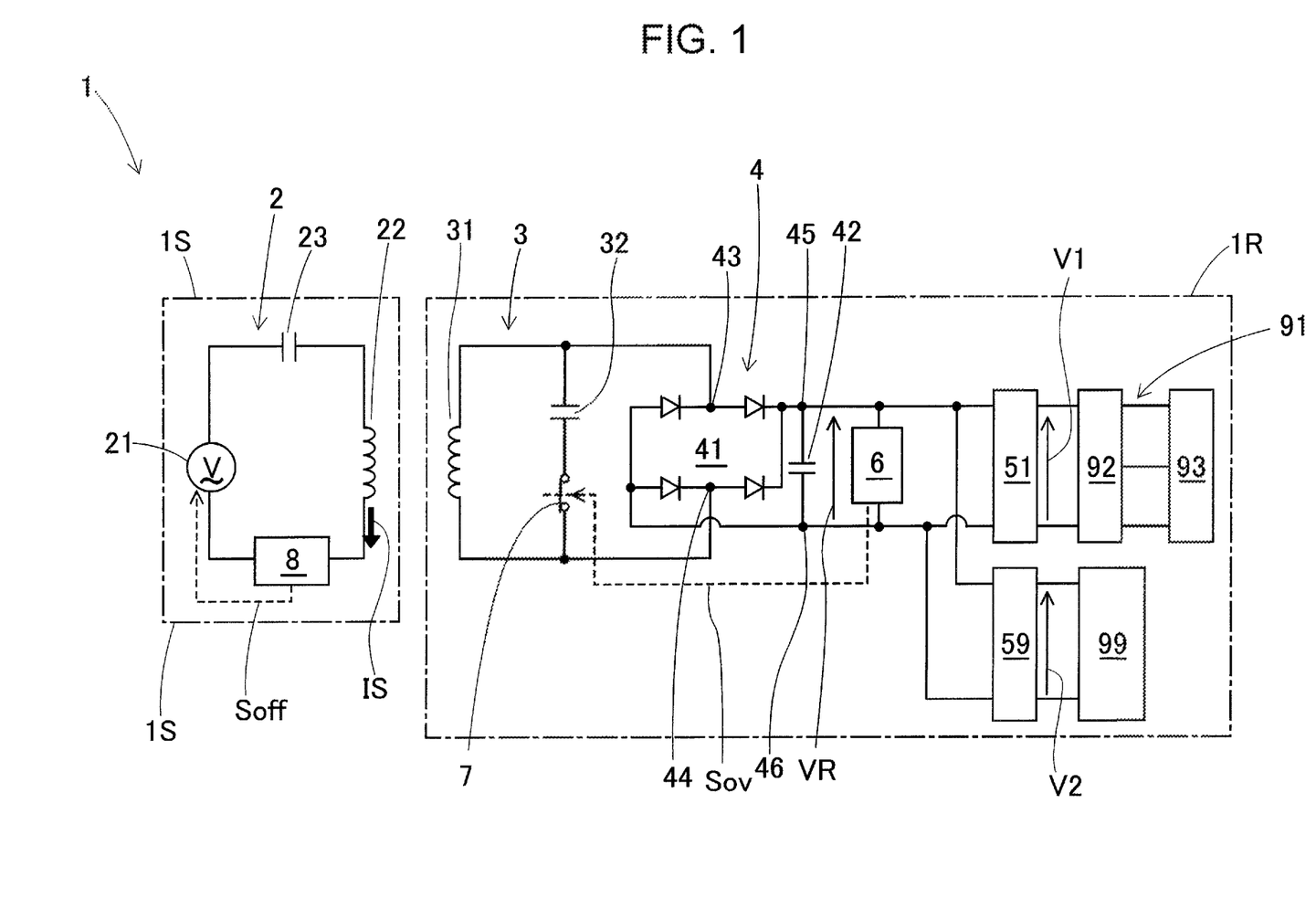
FIG. 1 is a circuit diagram illustrating an electrical configuration of a contactless power supply device of an embodiment.
Figure 3:
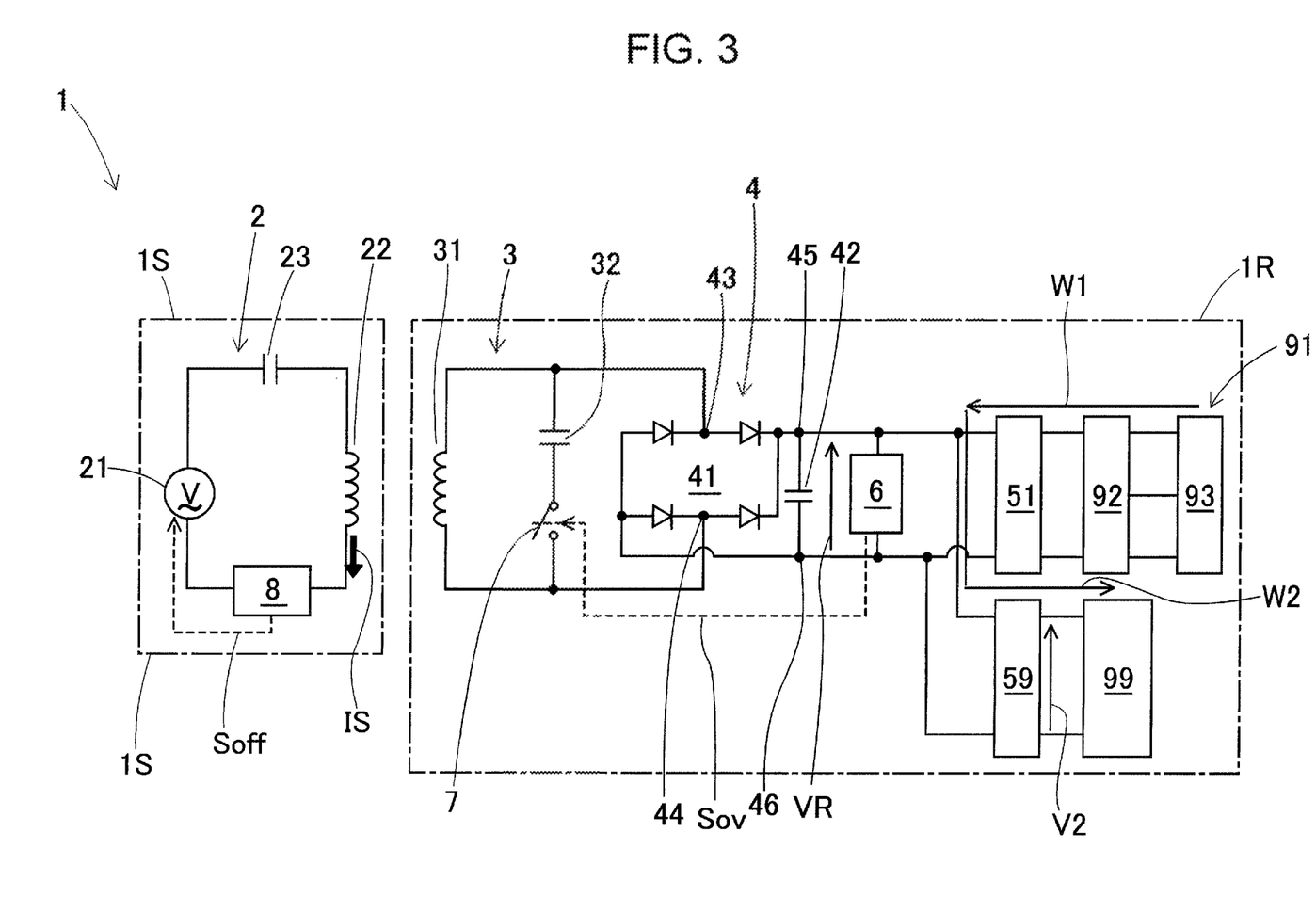
FIG. 3 is a diagram for illustrating a reverse transfer function of the first DC transformer circuit for reversely transferring regenerative power.

Contactless power supply device 1 of an embodiment of the present disclosure is described with reference to FIG. 1 to FIG. 3. FIG. 1 is a circuit diagram illustrating an electrical configuration of contactless power supply device 1 of this embodiment. Contactless power supply device 1 of this embodiment includes power-supply-side device 1S and power-receiving-side device 1R. Power-supply-side device 1S is disposed at a predetermined position. The position of power-receiving-side device 1R relative to power-supply-side device 1S is allowed to be changed. When power-receiving-side device 1R is disposed at a position so as to face power-supply-side device 1S, as illustrated in FIG. 1, contactless power supply device 1 performs contactless power supply.

Power-supply-side device 1S includes contactless power supply section 2 and current detection protection circuit 8. Contactless power supply section 2 has AC power source 21, power supply element 22, and power-supply-side resonant element 23. AC power source 21 supplies AC power to power supply element 22. AC power source 21 is formed by using, for example, a DC power source section that supplies a DC voltage and a publicly known bridge circuit that converts the DC voltage to an AC voltage. The frequency of AC power source 21 is set by taking into consideration a power-supply-side resonance frequency and a power-receiving-side resonance frequency described below.

Power supply element 22 and power-supply-side resonant element 23 are connected in series to AC power source 21. As a result, the power-supply-side resonance frequency is set. Power supply element 22 supplies AC power in a contactless manner. In this embodiment, power supply element 22 is implemented as a power supply coil, and power-supply-side resonant element 23 is implemented as a resonance capacitor.

Current detection protection circuit 8 is connected in series to power supply element 22. Current detection protection circuit 8 has a protection function against an error or a failure in contactless power supply device 1. Current detection protection circuit 8 detects AC current IS that flows through power supply element 22 and compares AC current IS with a threshold current used to determine an overcurrent state. In a case where AC current IS exceeds the threshold current over a predetermined period, current detection protection circuit 8 outputs stop signal Soff to AC power source 21. As a result, AC power source 21 stops. Current detection protection circuit 8 also has a function of a power-supply-side protection section of the present disclosure, as described below.

Power-receiving-side device 1R includes contactless power receiving section 3, rectifying-smoothing circuit 4, first DC transformer circuit 51, second DC transformer circuit 59, overvoltage detection section 6, and protection switch 7. In power-receiving-side device 1R, first electric load 91 having a power regeneration function and second electric load 99 that may or may not have a power regeneration function are mounted.

Contactless power receiving section 3 has power receiving element 31 and power-receiving-side resonant element 32. Power receiving element 31 is disposed so as to face power supply element 22, is electromagnetically coupled with power supply element 22, and receives AC power in a contactless manner. One end of power receiving element 31 is connected to first input terminal 43 of rectifying-smoothing circuit 4, and the other end thereof is connected to second input terminal 44 of rectifying-smoothing circuit 4. Power-receiving-side resonant element 32 is connected in parallel to power receiving element 31 when viewed from rectifying-smoothing circuit 4. As a result, the power-receiving-side resonance frequency is set. In this embodiment, power receiving element 31 is implemented as a power receiving coil, and power-receiving-side resonant element 32 is implemented as a resonance capacitor.

Rectifying-smoothing circuit 4 rectifies and smooths the AC voltage of the AC power received by contactless power receiving section 3 to generate DC reception-power voltage VR. Rectifying-smoothing circuit 4 is constituted by full-wave rectifier circuit 41 and smoothing capacitor 42. Full-wave rectifier circuit 41 is formed by bridge-connecting four rectifier diodes as illustrated. The AC voltage is input to full-wave rectifier circuit 41 via first input terminal 43 and second input terminal 44. Full-wave rectifier circuit 41 has positive-side terminal 45 and negative-side terminal 46 on the output side. Smoothing capacitor 42 is connected between positive-side terminal 45 and negative-side terminal 46. From positive-side terminal 45 and negative-side terminal 46, DC reception-power voltage VR is output.

Figure 2:
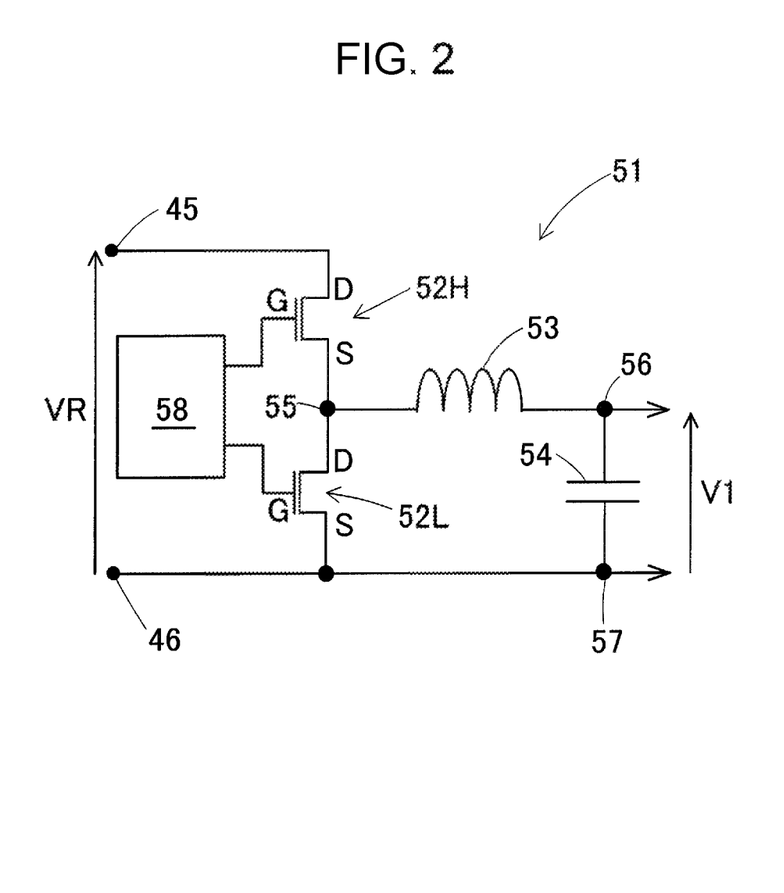
FIG. 2 is a circuit diagram illustrating an example circuit configuration of a first DC transformer circuit.

First DC transformer circuit 51 transforms DC reception-power voltage VR to first DC load voltage V1 and supplies first DC load voltage V1 to first electric load 91. First DC transformer circuit 51 has at least either a step-down function or a step-up function. Hereinafter, a description is given of an example case where it is assumed that first DC transformer circuit 51 is a DC step-down circuit having a step-down function. FIG. 2 is a circuit diagram illustrating an example circuit configuration of first DC transformer circuit 51. First DC transformer circuit 51 has high-side switching element 52H, low-side switching element 52L, choke coil 53, step-down-side capacitor 54, and voltage adjusting section 58. As high-side switching element 52H and low-side switching element 52L, for example, a MOSFET element or an IGBT element can be used. Hereinafter, a description is given of an example case where a MOSFET element is used.

High-side switching element 52H has drain D connected to positive-side terminal 45, drain D corresponding to a first terminal, and source S connected to intermediate point 55, source S corresponding to a second terminal. Low-side switching element 52L has drain D connected to intermediate point 55, drain D corresponding to a first terminal, and source S connected to negative-side terminal 46 and negative-side output terminal 57, source S corresponding to a second terminal. Choke coil 53 has one end connected to intermediate point 55 and the other end connected to positive-side output terminal 56. Step-down-side capacitor 54 has one end connected to positive-side output terminal 56 and the other end connected to negative-side output terminal 57. From positive-side output terminal 56 and negative-side output terminal 57, first DC load voltage V1, which is a lowered voltage, is output.

Voltage adjusting section 58 sends a control signal to gate G of high-side switching element 52H and gate G of low-side switching element 52L alternately. Then, high-side switching element 52H and low-side switching element 52L alternately enters a conducting state, and the step-down function becomes active. When first DC load voltage V1 shows a tendency to rise, voltage adjusting section 58 controls and decreases the ratio of the conducting time of high-side switching element 52H. To the contrary, when first DC load voltage V1 shows a tendency to drop, voltage adjusting section 58 controls and increases the ratio of the conducting time of high-side switching element 52H. Accordingly, first DC load voltage V1 is maintained substantially constant.

Here, even if low-side switching element 52L is replaced with a diode, the step-down function is maintained. However, this causes a loss for the forward resistance of the diode, resulting in reduced power supply efficiency. In this embodiment, a diode is not used but low-side switching element 52L is used to attain enhanced power supply efficiency. Then, first DC transformer circuit 51 functions as a step-up chopper circuit when viewed from first electric load 91. Therefore, first DC transformer circuit 51 has a reverse transfer function of transferring regenerative power generated by first electric load 91 in the reverse direction.

Second DC transformer circuit 59 transforms DC reception-power voltage VR to second DC load voltage V2 and supplies second DC load voltage V2 to second electric load 99. First DC transformer circuit 51 and second DC transformer circuit 59 are connected in parallel to the output side of rectifying-smoothing circuit 4. The circuit configuration of second DC transformer circuit 59 may be the same as that of first DC transformer circuit 51 or may be different from that of first DC transformer circuit 51. The magnitude of second DC load voltage V2 may be the same as that of first DC load voltage V1 or may be different from that of first DC load voltage V1.

Overvoltage detection section 6 is driven by second DC load voltage V2 and monitors DC reception-power voltage VR. Overvoltage detection section 6 generates overvoltage detection signal Sov while DC reception-power voltage VR exceeds a predetermined threshold voltage used to determine an overvoltage. Overvoltage detection signal Sov is used in open-close control of protection switch 7. The threshold voltage is set with a margin so as not to cause damage to circuit components of rectifying-smoothing circuit 4, first DC transformer circuit 51, and second DC transformer circuit 59. The threshold voltage is set based on the allowable maximum voltage of smoothing capacitor 42 or the allowable maximum voltage of high-side switching element 52H and low-side switching element 52L; however, the threshold voltage is not limited to this.

Protection switch 7 is connected in series to power-receiving-side resonant element 32. Protection switch 7 is usually closed to maintain the power-receiving-side resonance frequency, which is a reception-power feature. Protection switch 7 opens only when overvoltage detection signal Sov is generated, thereby disconnecting power-receiving-side resonant element 32. As a result, the power-receiving-side resonance frequency changes to a large degree, and AC power received by power receiving element 31 significantly decreases. Protection switch 7 is one embodiment of an overvoltage protection section of the present disclosure.

First electric load 91 is constituted by servo amplifier 92 and servo motor 93 but is not limited to this combination. Servo amplifier 92 is an electronic control device having a CPU and operating in accordance with software. Servo amplifier 92 generates a three-phase AC voltage from first DC load voltage V1 and applies the three-phase AC voltage to servo motor 93. First DC load voltage V1 can be, for example, 48V. Servo amplifier 92 controls rotation, stop and rotation speed of servo motor 93 by variably adjusting the time slot for applying the three-phase AC voltage and the effective value of the three-phase AC voltage.

Servo motor 93 generates regenerative power when decelerating. The generated regenerative power passes through servo amplifier 92 in the reverse direction and is reversely transferred to positive-side output terminal 56 and negative-side output terminal 57 of first DC transformer circuit 51.

Meanwhile, second electric load 99 is a control circuit and does not have a power regeneration function. Second DC load voltage V2 for driving second electric load 99 can be, for example, 24V.

Operations and Functions of Contactless Power Supply Device 1 of this Embodiment Now, the operations and functions of contactless power supply device 1 of this embodiment are described. When power-receiving-side device 1R is disposed at a position so as to face power-supply-side device 1S, contactless power supply device 1 starts contactless power supply. Accordingly, DC reception-power voltage VR is generated. First DC transformer circuit 51 lowers DC reception-power voltage VR to first DC load voltage V1 and outputs first DC load voltage V1. As a result, servo motor 93 can be rotated. While servo motor 93 consumes power or rotates by inertia, the step-down function in the forward direction becomes active in first DC transformer circuit 51. Simultaneously, second DC transformer circuit 59 lowers DC reception-power voltage VR to second DC load voltage V2 and outputs second DC load voltage V2. As a result, second electric load 99 starts operating.

When servo motor 93 decelerates and generates regenerative power, the reverse transfer function of first DC transformer circuit 51 becomes active. FIG. 3 is a diagram for illustrating the reverse transfer function of first DC transformer circuit 51 for reversely transferring regenerative power W1. Regenerative power W1 generated by servo motor 93 is reversely transferred to positive-side output terminal 56 and negative-side output terminal 57 via servo amplifier 92. Even if regenerative power W1 is being generated, voltage adjusting section 58 of first DC transformer circuit 51 alternately puts high-side switching element 52H and low-side switching element 52L into a conducting state.

While low-side switching element 52L is conductive, regenerative power W1 is stored in choke coil 53 as energy. When low-side switching element 52L is cut off and high-side switching element 52H becomes conductive, the energy stored in choke coil 53 instantaneously generates a high voltage, which is reversely transferred to smoothing capacitor 42. When this operation is repeated, an electric charge stored in smoothing capacitor 42 can increase. If second electric load 99 does not operate, the increase in the electric charge stored in smoothing capacitor 42 results in a rise in DC reception-power voltage VR.

Therefore, when second electric load 99 operates and needs power consumption W2, regenerative power W1 is preferentially consumed, and contactless power supply is used to compensate for shortages. Accordingly, the load of contactless power supply is reduced. In a case where regenerative power W1 is larger than power consumption W2, contactless power supply is not necessary, power is in excess, and DC reception-power voltage VR rises.

In a case where power regeneration by servo motor 93 continues and DC reception-power voltage VR reaches the threshold voltage, overvoltage detection section 6 detects this event and generates overvoltage detection signal Sov. When overvoltage detection signal Sov is generated, protection switch 7 is opened, as illustrated in FIG. 3. As a result, AC power received by power receiving element 31 significantly decreases, and a rise in DC reception-power voltage VR is suppressed. At this time, AC current IS that flows through power supply element 22 of power-supply-side device 1S significantly changes.

When power regeneration by servo motor 93 ends, the electric charge excessively stored in smoothing capacitor 42 is preferentially consumed, and DC reception-power voltage VR gradually decreases. When DC reception-power voltage VR decreases below the threshold voltage, overvoltage detection section 6 detects this event and cancels overvoltage detection signal Sov. As a result, protection switch 7 is closed, the power-receiving-side resonance frequency recovers, and the original contactless power supply is restarted.

The duration of power regeneration by servo motor 93 is limited, and the amount of power that is the integral of regenerative power W1 is equal to or smaller than a predetermined amount. Therefore, there may be a case where DC reception-power voltage VR does not reach the threshold voltage, and protection switch 7 is not opened in this case. In a case where DC reception-power voltage VR reaches the threshold voltage, overvoltage protection by overvoltage detection section 6 and protection switch 7 is performed. Therefore, there is little possibility of damage to circuit components.

However, as a backup protection function used in a case where the duration of power regeneration by servo motor 93 is exceptionally long, current detection protection circuit 8 of power-supply-side device 1S operates. Current detection protection circuit 8 stops AC power source 21 when AC current IS flowing through power supply element 22 changes for more than a predetermined period due to opening of protection switch 7, which is the overvoltage protection section. Current detection protection circuit 8 has a function of the power-supply-side protection section that detects the AC power supplied from contactless power supply section 2 changing for more than the predetermined period due to opening of protection switch 7 and stops contactless power supply section 2. Current detection protection circuit 8 also has the protection function against a typical error or failure, as described above.

As described above, in this embodiment, regenerative power W1 generated by first electric load 91 is transferred via first DC transformer circuit 51 and second DC transformer circuit 59 and consumed by second electric load 99. That is, regenerative power W1 is effectively used, and the load of contactless power supply is reduced. In a case where regenerative power W1 is in excess and DC reception-power voltage VR reaches the threshold voltage, the protection function becomes active.

Forms and Effects of Contactless Power Supply Device 1 of this Embodiment

Contactless power supply device 1 of this embodiment includes: contactless power supply section 2 that supplies AC power in a contactless manner contactless power receiving section 3 that is disposed so as to face contactless power supply section 2 and receives the AC power in a contactless manner rectifying-smoothing circuit 4 that rectifies and smooths the AC voltage of the AC power received by contactless power receiving section 3 to generate DC reception-power voltage VR; first DC transformer circuit 51 that lowers DC reception-power voltage VR to first DC load voltage V1 and supplies first DC load voltage V1 to first electric load 91; and second DC transformer circuit 59 that lowers DC reception-power voltage VR to second DC load voltage V2 and supplies second DC load voltage V2 to second electric load 99, in which first DC transformer circuit 51 has the reverse transfer function of transferring regenerative power W1 generated by first electric load 91 in the reverse direction.

Accordingly, first DC transformer circuit 51 transfers regenerative power W1 generated by first electric load 91 in the reverse direction. Therefore, regenerative power W1 is allocated and made available to the other electric loads including second electric load 99. Further, a power storage section is not necessary, which suppresses an increase in the weight and size of power-receiving-side device 1R.

Further, contactless power supply device 1 of this embodiment includes rectifying-smoothing circuit 4 that rectifies and smooths the AC voltage of the AC power received by contactless power receiving section 3, thereby converting the AC voltage to DC reception-power voltage VR; first DC transformer circuit 51 is a first DC step-down circuit that lowers DC reception-power voltage VR to first DC load voltage V1 and supplies first DC load voltage V1 to first electric load 91; and second DC transformer circuit 59 is a second DC step-down circuit that lowers DC reception-power voltage VR to second DC load voltage V2 and supplies second DC load voltage V2 to second electric load 99. Accordingly, the circuit configuration of power-receiving-side device 1R can be simplified.

Further, first DC transformer circuit 51 and second DC transformer circuit 59 are connected in parallel to the output side of rectifying-smoothing circuit 4, and regenerative power W1 generated by first electric load 91 is transferred via first DC transformer circuit 51 and second DC transformer circuit 59 and consumed by second electric load 99. Accordingly, regenerative power W1 generated by first electric load 91 is transferred and effectively used by second electric load 99, and the load of contactless power supply is reduced.

Further, rectifying-smoothing circuit 4 has positive-side terminal 45 and negative-side terminal 46 from which DC reception-power voltage VR is output; and first DC transformer circuit 51 has high-side switching element 52H having the first terminal (drain D) connected to positive-side terminal 45 and the second terminal (source S) connected to intermediate point 55, low-side switching element 52L having the first terminal (drain D) connected to intermediate point 55 and the second terminal (source S) connected to negative-side terminal 46 and one end of first electric load 91, choke coil 53 connected between intermediate point 55 and the other end of first electric load 91, and step-down-side capacitor 54 connected in parallel to first electric load 91. Accordingly, a diode is not used on the low side of first DC transformer circuit 51 but low-side switching element 52L is used to thereby enhance usual power supply efficiency.

Contactless power supply device 1 further includes: overvoltage detection section 6 that generates overvoltage detection signal Sov while DC reception-power voltage VR, which can rise by first DC transformer circuit 51 transferring regenerative power W1 in the reverse direction, exceeds the threshold voltage used to determine an overvoltage; and the overvoltage protection section that changes a reception-power feature of contactless power receiving section 3 when overvoltage detection signal Sov is generated, thereby reducing the AC power that is received or cutting the AC power that is received to zero. Accordingly, the AC power received by contactless power supply can be reduced and regenerative power W1 can be preferentially consumed, which can suppress a rise in DC reception-power voltage VR.

Further, contactless power receiving section 3 has power receiving element 31 and power-receiving-side resonant element 32 connected in parallel to power receiving element 31; and the overvoltage protection section is protection switch 7 that disconnects power-receiving-side resonant element 32 when overvoltage detection signal Sov is generated. Accordingly, when protection switch 7 opens, the power-receiving-side resonance frequency, which is a reception-power feature, changes to a large degree, and the AC power received by power receiving element 31 significantly decreases. Therefore, the effect of suppressing a rise in DC reception-power voltage VR becomes significant, and there is little possibility of damage to circuit components.

Contactless power supply device 1 further includes the power-supply-side protection section (current detection protection circuit 8) that detects the AC power supplied from contactless power supply section 2 changing for more than the predetermined period due to operating of the overvoltage protection section (protection switch 7) and stops contactless power supply section 2. Accordingly, the power-supply-side protection section has the backup protection function used in a case where the duration of power regeneration by servo motor 93 is exceptionally long.

Further, contactless power supply section 2 has power supply element 22 and AC power source 21 that applies an AC voltage to power supply element 22; and the power-supply-side protection section is current detection protection circuit 8 that stops AC power source 21 when AC current IS flowing through power supply element 22 changes for more than the predetermined period due to operating of the overvoltage protection section (protection switch 7). Accordingly, current detection protection circuit 8 has both the function of the power-supply-side protection section and the protection function against a typical error or failure.

Applications and Modifications of this Embodiment

Note that the present disclosure is not limited to contactless power supply device 1 of an electromagnetic induction system described in the embodiment above. That is, the present disclosure is applicable to a device of a capacitive coupling system or an electromagnetic field resonance system for supplying AC power in a contactless manner. Further, a form can be employed in which second electric load 99 also has a power regeneration function and first electric load 91 and second electric load 99 mutually use regenerative power. Further, the connection position of protection switch 7 can be modified as appropriate. For example, when protection switch 7 is connected in series to one end of power receiving element 31, the AC power received in a contactless manner becomes zero when protection switch 7 opens. Other various applications and modifications are possible for the present disclosure.

REFERENCE SIGNS LIST

1: contactless power supply device, 2: contactless power supply section, 21: AC power source, 22: power supply element, 23: power-supply-side resonant element, 3: contactless power receiving section, 31: power receiving element, 32: power-receiving-side resonant element, 4: rectifying-smoothing circuit, 41: full-wave rectifier circuit, 42: smoothing capacitor, 45: positive-side terminal, 46: negative-side terminal, 51: first DC transformer circuit, 52H: high-side switching element, 52L: low-side switching element, 53: choke coil, 54: step-down-side capacitor, 59: second DC transformer circuit, 6: overvoltage detection section, 7: protection switch, 8: current detection protection circuit, 91: first electric load, 92: servo amplifier, 93: servo motor, 99: second electric load, VR: DC reception-power voltage, V1: first DC load voltage, V2: second DC load voltage, W1: regenerative power, W2: power consumption, IS: AC current, Soff: stop signal, Sov: overvoltage detection signal

The invention claimed is:

1. A contactless power supply device, comprising:
a contactless power supply section configured to supply AC power in a contactless manner;
a contactless power receiving section disposed so as to face the contactless power supply section and configured to receive the AC power in a contactless manner;
a first DC transformer circuit configured to transform, to a DC load voltage, a DC reception-power voltage obtained by converting an AC voltage of the AC power received by the contactless power receiving section and supply the DC load voltage to a first electric load, and to have a reverse transfer function of transferring regenerative power generated by the first electric load in a reverse direction; and
a second DC transformer circuit configured to transform the DC reception-power voltage to a DC load voltage and supply the DC load voltage to a second electric load, wherein
the contactless power supply device includes a smoothing capacitor, and
the contactless power supply device is configured such that but for the smoothing capacitor, regenerative power generated by the first electric load is allocated and made available to the second electric load without storing the regenerative power in a battery or charge capacitor as a power storage section.

2. The contactless power supply device according to claim 1, further comprising
a rectifying-smoothing circuit configured to rectify and smooth the AC voltage of the AC power received by the contactless power receiving section, thereby converting the AC voltage to the DC reception-power voltage, wherein
the smoothing capacitor forms part of the rectifying-smoothing circuit,
the first DC transformer circuit is a first DC step-down circuit configured to lower the DC reception-power voltage to the DC load voltage and supply the DC load voltage to the first electric load, and
the second DC transformer circuit is a second DC step-down circuit configured to lower the DC reception-power voltage to the DC load voltage and supply the DC load voltage to the second electric load.

3. The contactless power supply device according to claim 2, wherein
the first DC step-down circuit and the second DC step-down circuit are connected in parallel to an output side of the rectifying-smoothing circuit, and
the regenerative power generated by the first electric load is transferred via the first DC step-down circuit and the second DC step-down circuit and consumed by the second electric load.

4. The contactless power supply device according to claim 2, wherein
the rectifying-smoothing circuit has a positive-side terminal and a negative-side terminal from which the DC reception-power voltage is output, and
the first DC step-down circuit includes
a high-side switching element having a first terminal connected to the positive-side terminal and a second terminal connected to an intermediate point,
a low-side switching element having a first terminal connected to the intermediate point and a second terminal connected to the negative-side terminal and one end of the first electric load,
a choke coil connected between the intermediate point and the other end of the first electric load, and
a step-down-side capacitor connected in parallel to the first electric load.

5. The contactless power supply device according to claim 1, further comprising:
an overvoltage detection section configured to generate an overvoltage detection signal while the DC reception-power voltage exceeds a predetermined threshold voltage used to determine an overvoltage in a case in which the DC reception-power voltage rises by the first DC transformer circuit transferring the regenerative power in the reverse direction; and
an overvoltage protection section configured to change a reception-power feature of the contactless power receiving section when the overvoltage detection signal is generated, thereby reducing the AC power that is received or cutting the AC power that is received to zero.

6. The contactless power supply device according to claim 5, wherein
the contactless power receiving section has a power receiving element and a power-receiving-side resonant element connected in parallel to the power receiving element, and
the overvoltage protection section is a protection switch configured to disconnect the power-receiving-side resonant element when the overvoltage detection signal is generated.

7. The contactless power supply device according to claim 5, further comprising
a power-supply-side protection section configured to detect the AC power supplied from the contactless power supply section changing for more than a predetermined period due to operating of the overvoltage protection section and stop the contactless power supply section.

8. The contactless power supply device according to claim 7, wherein
the contactless power supply section has a power supply element and an AC power source configured to apply an AC voltage to the power supply element, and
the power-supply-side protection section is a current detection protection circuit configured to stop the AC power source when an AC current flowing through the power supply element changes for more than the predetermined period due to operating of the overvoltage protection section.

9. The contactless power supply device according to claim 1, wherein the first electric load includes a servo amplifier and a servo motor.

10. The contactless power supply device according to claim 9, wherein the second electric load is an electronic control device.

11. The contactless power supply device according to claim 1, wherein
the contactless power supply section includes a power supply side resonant element,
the contactless power receiving section includes a power receiving side resonant element, and
but for the power supply side resonant element, the power receiving side resonant element, and the smoothing capacitor, the contactless power supply device does not include the power storage section upstream of the first DC transformer circuit and the second DC transformer circuit.

12. The contactless power supply device according to claim 1, wherein
the contactless power receiving section includes a power receiving side resonant element, and
but for the power receiving side resonant element and the smoothing capacitor, the contactless power receiving section does not include the power storage section upstream of the first DC transformer circuit and the second DC transformer circuit.

* * * * *